United States Patent
Jones et al.

(10) Patent No.: US 7,464,736 B2
(45) Date of Patent: Dec. 16, 2008

(54) SYSTEM AND METHOD FOR PREVENTING INCORRECT AIRCRAFT FUEL USAGE

(75) Inventors: Philip E. Jones, Naples, FL (US); Brian P. Greenawalt, Naples, FL (US); Michael O'Hara, Naples, FL (US); Cesar Gonzalez, Witchita, KS (US)

(73) Assignee: Shaw Aero Devices, Inc., Naples, FL (US)

( * ) Notice: Subject to any disclaimer, the term of this patent is extended or adjusted under 35 U.S.C. 154(b) by 285 days.

(21) Appl. No.: 11/166,527

(22) Filed: Jun. 24, 2005

(65) Prior Publication Data

US 2007/0000571 A1  Jan. 4, 2007

Related U.S. Application Data

(60) Provisional application No. 60/582,774, filed on Jun. 24, 2004.

(51) Int. Cl.
*B65B 1/04* (2006.01)
(52) U.S. Cl. .............. 141/350; 141/348; 141/349; 220/86.2
(58) Field of Classification Search ............. 141/1, 141/2, 97, 98, 301, 302, 348–352; 220/86.2
See application file for complete search history.

(56) References Cited

U.S. PATENT DOCUMENTS

| | | | |
|---|---|---|---|
| 3,730,216 A | 5/1973 | Arnett et al. | 137/588 |
| 3,880,214 A * | 4/1975 | Slavin | 141/346 |
| 3,880,317 A | 4/1975 | Arnett | 220/86 R |
| 3,911,977 A | 10/1975 | Berger | 141/348 |
| 3,942,564 A | 3/1976 | Nakazato | 141/348 |
| 4,034,784 A | 7/1977 | Ball et al. | 141/348 |
| 4,248,279 A | 2/1981 | Warmbold | 141/348 |
| 4,424,839 A | 1/1984 | Otani et al. | 141/348 |
| 4,526,216 A | 7/1985 | Lake, Jr. | 141/348 |
| 4,527,601 A | 7/1985 | Middleton et al. | 141/348 |
| 4,529,097 A | 7/1985 | Larson | 220/86 R |
| 4,635,813 A | 1/1987 | Peickert | 220/86 R |
| 4,653,660 A * | 3/1987 | Shaw | 220/86.2 |
| 4,733,791 A | 3/1988 | Sinclair | 220/86 R |
| 5,325,979 A | 7/1994 | Watanabe | 220/86.2 |
| 6,302,169 B1 | 10/2001 | Pulos | 141/301 |
| 6,382,270 B1 * | 5/2002 | Gzik | 141/94 |
| 6,607,014 B2 | 8/2003 | Webb | 141/367 |
| 6,966,349 B1 * | 11/2005 | Laduke | 141/367 |
| 6,968,874 B1 * | 11/2005 | Gabbey et al. | 141/349 |
| 7,077,178 B2 * | 7/2006 | Hedevang | 141/367 |

* cited by examiner

*Primary Examiner*—Timothy L Maust
(74) *Attorney, Agent, or Firm*—Morgan, Lewis & Bockius LLP

(57) ABSTRACT

An aircraft refueling system incorporates a fuel port adapter configured to allow the use of jet fuel nozzle spout but prevent the use of avgas nozzle spout. The device has an opening that configured to receive a standard jet fuel nozzle spout. The device also includes a blocking plate that prevents a smaller, round standard avgas nozzle spout from being inserted into the opening. In addition, the device includes one or more spring-loaded flapping doors to prevent incorrect refueling while the jet fuel nozzle spout is not inserted through the flapping doors.

16 Claims, 7 Drawing Sheets

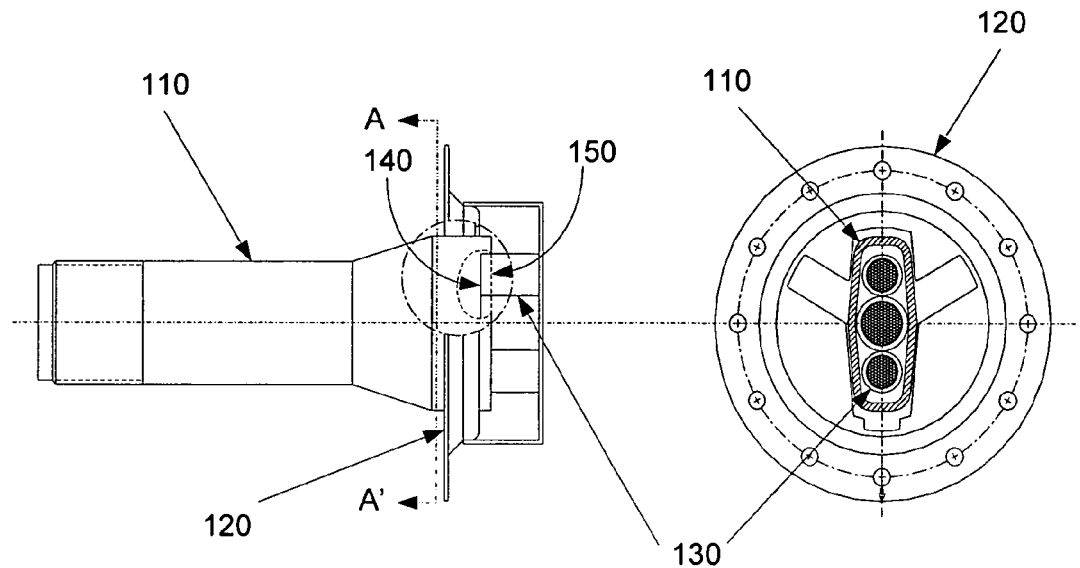
FIG. 1A  FIG. 1B
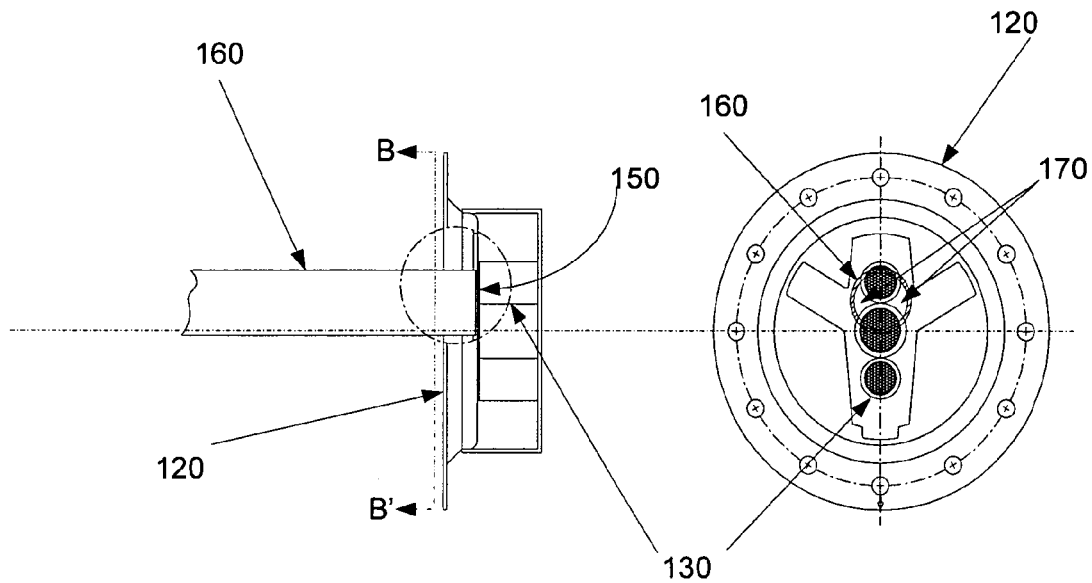
FIG. 2A  FIG. 2B

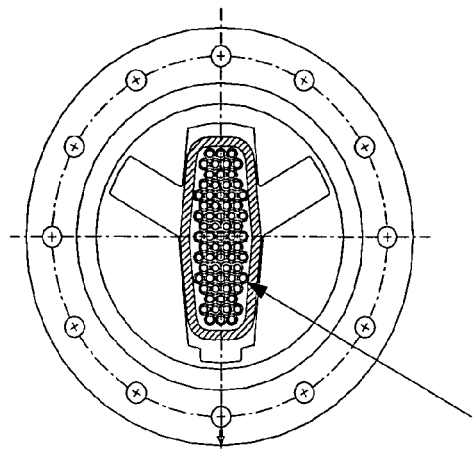
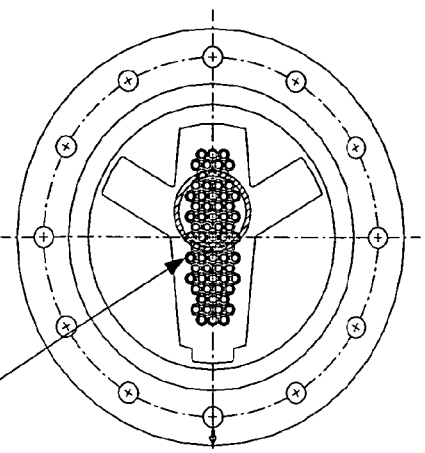
FIG. 3A 210 FIG. 3B
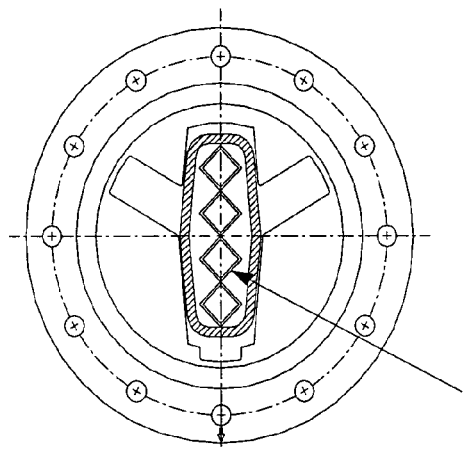
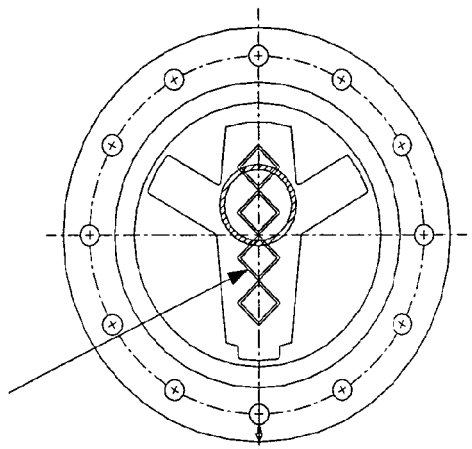
FIG. 4A 220 FIG. 4B
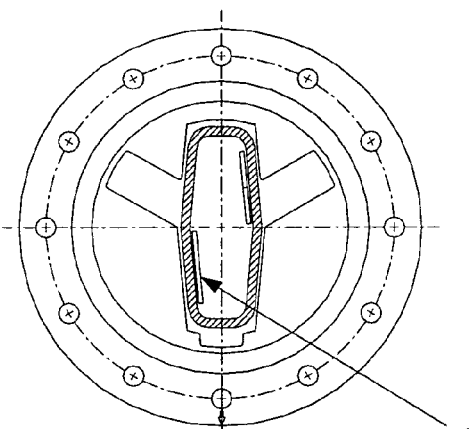
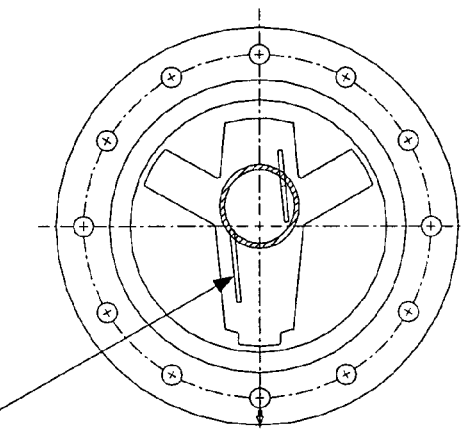
FIG. 5A 230 FIG. 5B

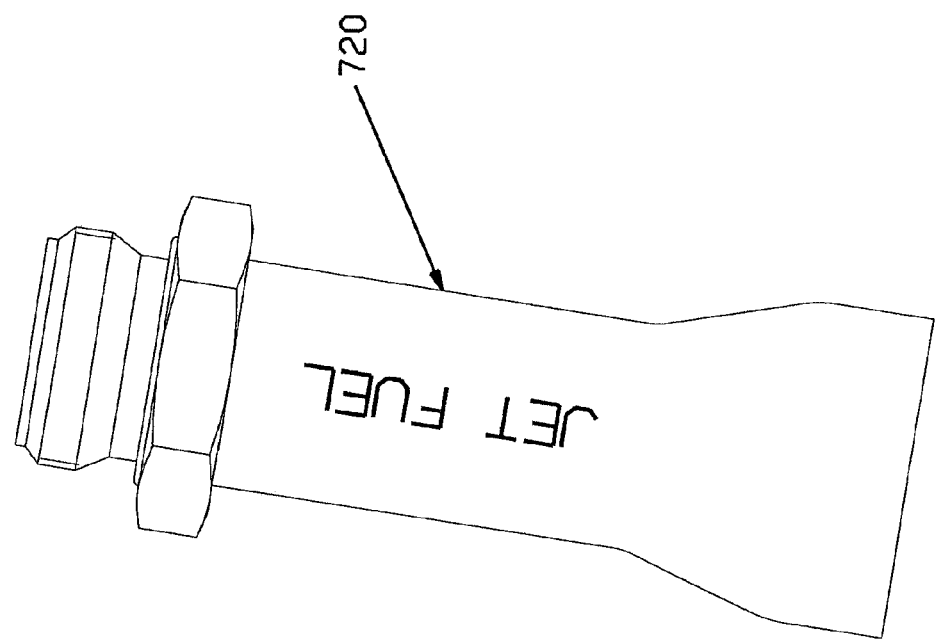
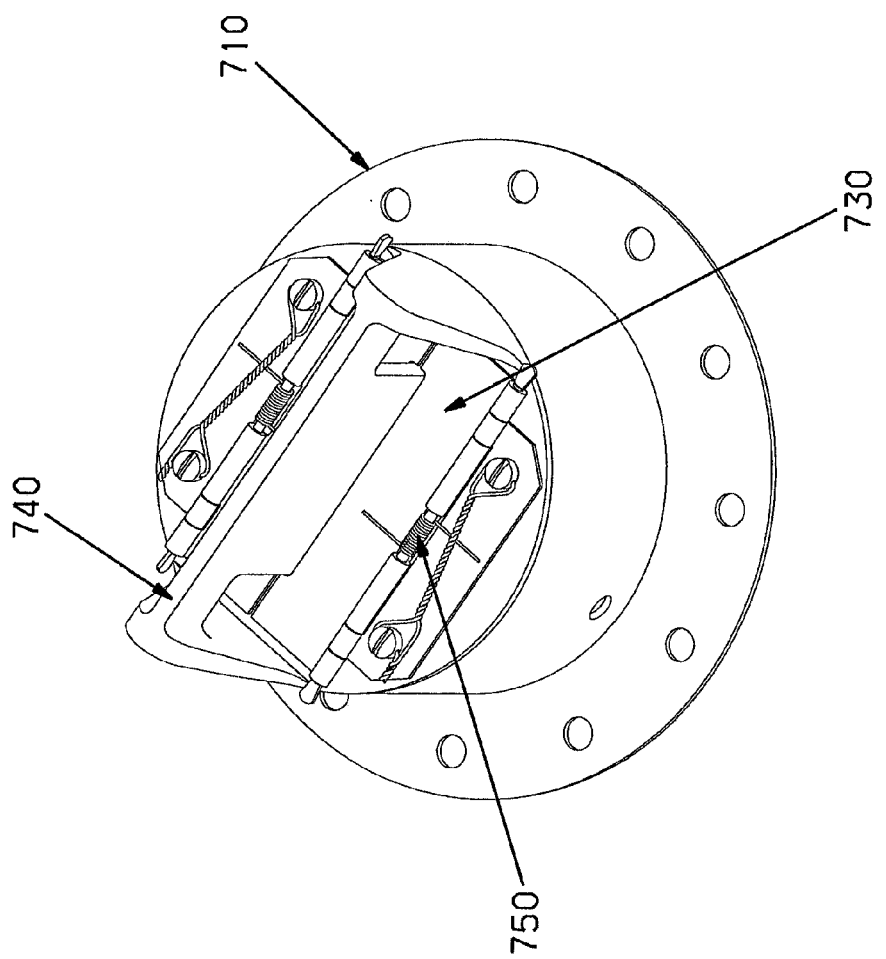
FIG. 7A

SYSTEM AND METHOD FOR PREVENTING INCORRECT AIRCRAFT FUEL USAGE

CROSS-REFERENCE TO RELATED APPLICATIONS

The present application claims priority pursuant to 35 U.S.C. §119(e) to U.S. Provisional Application Ser. No. 60/582,774 filed Jun. 24, 2004, which is hereby incorporated by reference for all purposes.

FIELD OF THE INVENTION

The present invention relates generally to aircraft refueling systems, and in particular to a fuel nozzle spout adapter that prevents introduction or delivery of aviation gasoline into a fuel tank while allowing the introduction or delivery of jet fuel into the same fuel tank.

BACKGROUND OF THE INVENTION

When the Society of Automotive Engineers (SAE) developed the AS1852 specification, conventional turbine engines installed in aircraft were powered by either aviation gasoline (also known as "avgas") or jet fuel. New aircraft piston engines powered by less expensive jet and diesel fuels, however, cannot operate on regular avgas. Therefore, in order to avoid engine failures in flight, it is highly desirable to develop a new fuel nozzle spout adapter to prevent introduction or delivery of the wrong type of fuel into these new aircraft piston engines.

SUMMARY

According to one embodiment of the present invention, an aircraft refueling system incorporates a fuel port adapter configured to allow refueling using of jet fuel nozzle spout, but not an avgas nozzle spout. In particular, the fuel port adapter includes an interference device to prevent misfueling. The interference device has an opening configured to receive the standard jet fuel nozzle spout and a blocking plate that prevents any avgas nozzle spout from being inserted into the opening. The device further includes one or more spring-loaded flapping doors to prevent incorrect refueling when the jet fuel nozzle spout is not fully inserted through the flapping doors.

BRIEF DESCRIPTION OF THE DRAWINGS

For a better understanding of the nature and objects of the invention, reference should be made to the following detailed description taken in conjunction with the accompanying drawings, in which:

FIGS. 1A and 1B are a respective side view and front view of a jet fuel nozzle spout inserted into a fuel port adapter, according to an embodiment of the present invention;

FIGS. 2A and 2B are a respective side view and front view of a standard round avgas nozzle spout inserted into the fuel port adapter shown in FIGS. 1A and 1B:

FIGS. 3A and 3B are two front views illustrating the operation of a fuel port adapter, according to another embodiment of the present invention;

FIGS. 4A and 4B are two front views illustrating the operation of a fuel port adapter, according to yet another embodiment of the present invention;

FIGS. 5A and 5B are two front views illustrating the operation of one other fuel port adapter, according to one other embodiment of the present invention;

FIGS. 7A and 7B are two perspective views of the fuel port adapter shown in FIG. 6A and a standard jet fuel nozzle spout.

Like reference numerals refer to corresponding parts throughout the several views of the drawings.

DESCRIPTION OF EMBODIMENTS

Figure 6A:
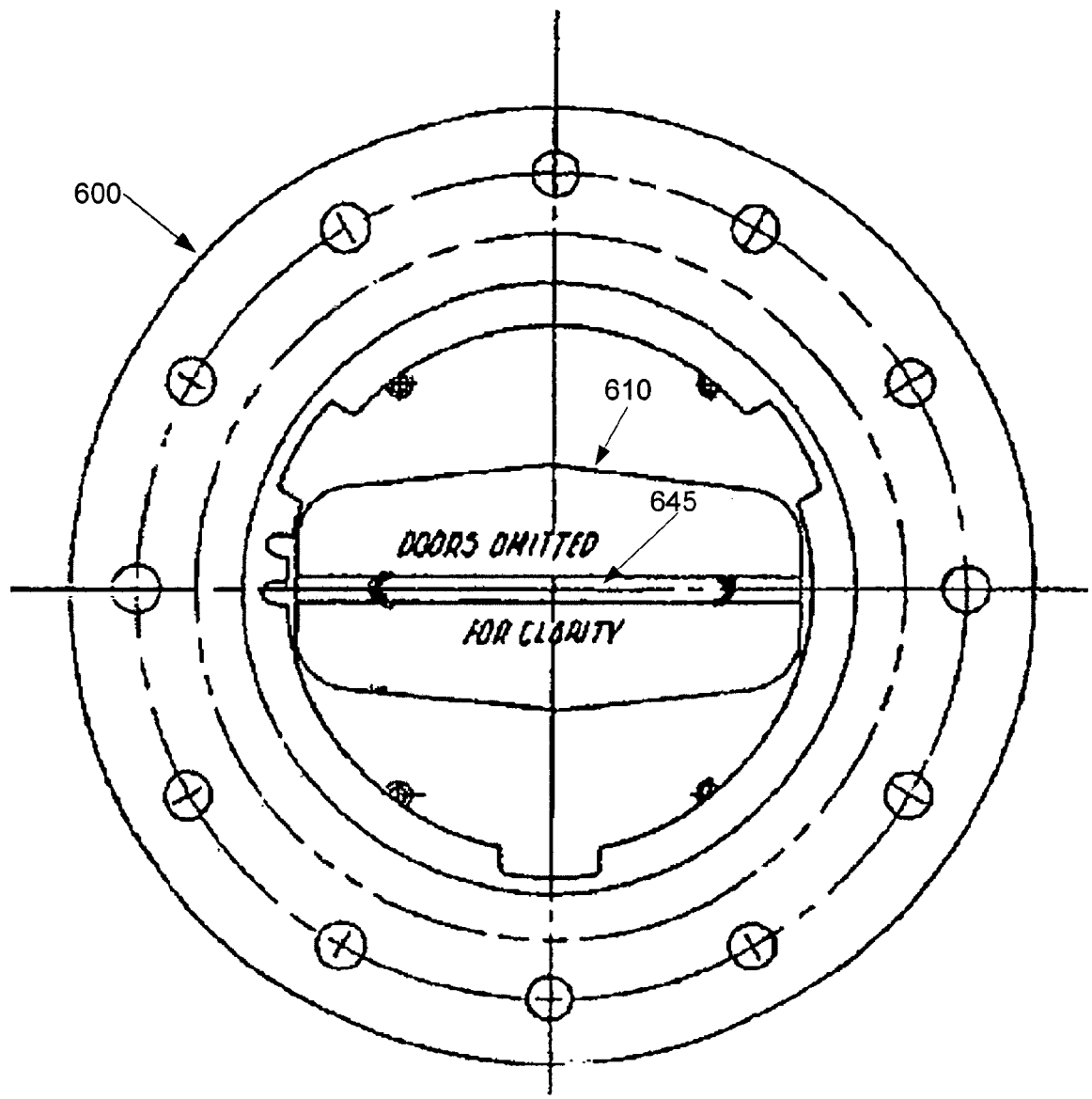
FIG. 6A is a front view illustrating the operation of another fuel port adapter, according to another embodiment of the present invention.

According to some embodiments of the present invention, a fuel port adapter includes a housing that allows a standard jet fuel nozzle spout but not any avgas nozzle spout from being used to refuel aircraft. For example, the fuel port adapter into which the jet fuel nozzle spout is inserted, defines an opening that is shaped to allow the standard jet fuel nozzle spout (as defined by the AS1852 specification) to be inserted into the opening to refuel an aircraft, while preventing insertion of the standard avgas nozzle spout into the opening. An interference device is installed in the fuel port adapter to prevent standard avgas nozzle spouts from being inserted into the housing. This interference device may have many different shapes including, but not limited to, vertical tubes, vertical cells, vertical rods, and vertical plate(s), some of which are described below.

FIGS. 1A and 1B are a respective side view and front view of a standard jet fuel nozzle spout 110 inserted into a fuel port adapter 120, according to an embodiment of the present invention. The jet fuel nozzle spout 110 has an approximately ovular cross-section, as best seen in FIG. 1B. The ovular cross-section has a long diameter defining its length and a short diameter defining its width. The fuel port adapter 120 defines an opening configured to receive at least a portion of the jet fuel nozzle spout 110. In other words, the jet fuel nozzle spout 110 can be inserted into the opening of the fuel port adapter 110 to a predefined depth. In some embodiments, this predefined depth is controlled by the location of an abutment surface 150 in the fuel port adapter 120.

The abutment surface 150 extends perpendicular to the direction of insertion of the jet fuel nozzle spout 110. In use, the jet fuel nozzle spout 110 is inserted into the opening of the fuel port adapter 120 until its front surface abuts against the abutment surface 150, as best seen in FIG. 1A. In this position, the jet fuel nozzle spout 110 cannot be inserted any deeper into the opening of the fuel port adapter 120.

The fuel port adapter 120 also includes an interference device 130. The interference device 130 is disposed within the opening defined by the fuel port adapter 120. The interference device 130 is also configured and dimensioned to fit within the ovular cross-sectional area of the jet fuel nozzle spout 110. In other words, the jet fuel nozzle spout 110 may be inserted into the opening of the fuel port adapter 120 with the interference device 130 at least partially extended into the interior space defined by the jet fuel nozzle spout 110.

FIG. 1B is a cross-sectional front view of the same configuration, as viewed along line A-A' in FIG. 1A. In this embodiment, the interference device 130 comprises three metal tubes positioned substantially parallel to a direction of insertion of the jet fuel nozzle spout 110. Fuel flowing out of the jet fuel nozzle spout 110 is pumped into a fuel tank (not shown) connected to the fuel port adapter 120 through the three metal tubes. Since the front surface of the jet fuel nozzle spout 110 is surrounded by the fuel port adapter 120 and the interference device 130, no fuel can leak out of the interface between the jet fuel nozzle spout 110 and the fuel port adapter 120.

FIGS. 2A and 2B are a respective side view and front view of a standard smaller, round avgas nozzle spout 160 being attempted to be inserted into the same fuel port adapter 120. Unlike FIG. 1A, FIG. 2A shows that the front surface of the avgas nozzle spout 160 directly contacts the front surface of the interference device 130. Therefore, the avgas nozzle spout 160 is restricted from being inserted into the space between the fuel port adapter 120 and the three tubes associated with the interference device 130. In this embodiment, if avgas is attempted to be introduced from the avgas nozzle spout 160 into the fuel tank, at least a portion of the avgas will leak out of the fuel port adapter 120 where the front surface of the avgas nozzle spout 160 does not encompass the contour or perimeter of the three tubes. Accordingly, the fuel port adapter 120 defines an opening that has a cross-sectional shape similar to that of the jet fuel nozzle spout 110 such that jet fuel can flow into the fuel tank through the opening. An interference device having multiple tubes is positioned in the opening and attached to the fuel port adapter 120 to block the avgas nozzle spout 160. In use, the jet fuel nozzle spout 110 can be fully inserted into the opening as its front surface is not blocked by the interference device. However, the avgas nozzle spout cannot achieve the same result because at least a portion of its front surface is blocked by the interference device before the avgas nozzle spout 160 is completely inserted into the opening. The combination that the avgas nozzle spout 160 cannot be fully inserted together with leaking fuel (if the introduction of avgas is attempted) provides visual alerts to an operator that the aircraft cannot operate on avgas, and such attempt should be terminated immediately.

FIGS. 3A and 3B are two top views illustrating how a different interference device 210 having multiple cells allows a standard jet fuel nozzle spout to be inserted into the adapter while blocking a standard avgas nozzle spout. Similar to the embodiment shown in FIGS. 1B and 2B, the vertical cells in the interference device 210 define an opening, such that a standard jet fuel nozzle spout can bypass the interference device 210 while a standard avgas nozzle spout is blocked by the interference device 210. Here, the interference device 210 includes a plurality of tubes, each having a small cross-section. The tubes are disposed parallel to a direction of insertion of a nozzle spout. The tubes are formed into a bundle having a cross sectional area slightly smaller than the cross-sectional area of the jet fuel nozzle spout such that they can fit within the opening of the jet fuel nozzle spout. When an operator accidentally inserts an avgas nozzle spout into the fuel port adapter, the front surface of the avgas nozzle spout cannot avoid contacting into the interference device 210. As a result, if the operator attempts to introduce avgas into the fuel port adapter, at least a portion of the avgas will leak out of the fuel port adapter. Again, the combination that the avgas nozzle spout cannot be inserted as well as with leaking fuel (if the introduction of avgas is attempted) prompts an operator to terminate the introduction of avgas immediately.

Two other types of interference devices, vertical rods 220 and vertical plates 230, are depicted respectively in FIGS. 4A-4B and FIGS. 5A-5B. The operation of these fuel port adapters is similar to what is discussed above in connection with FIGS. 3A and 3B. In other words, an opening is formed in a space defined by the fuel port adapter. The opening has an interference device that allows a standard jet fuel nozzle spout to be inserted therein but blocks a standard avgas nozzle spout. As a result, when an operator attempts to introduce avgas into a fuel tank having such a fuel port adapter, the interference between a standard avgas nozzle spout and the opening will prevent an avgas nozzle spout from being inserted into the adapter and cause an overflow or back-splash of avgas from the fuel port adapter (if the introduction of avgas is attempted).

Figure 6B:
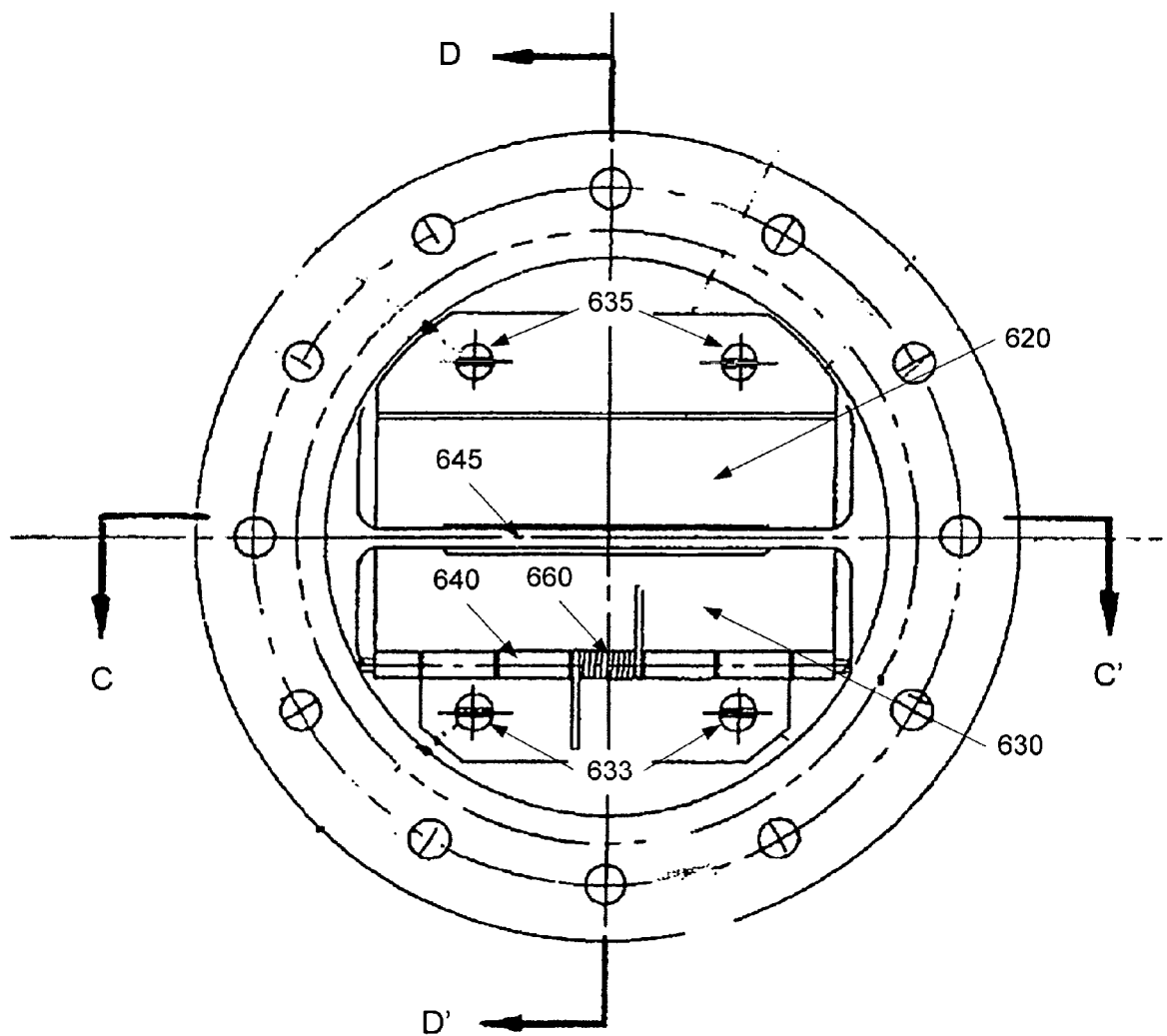
FIG. 6B is a bottom view illustrating the operation of the fuel port adapter shown in FIG. 6A.

FIGS. 6A-6D are different views illustrating the operation of a fuel port adapter 600 according to yet another embodiment of the present invention. In particular, FIGS. 6A and 6B are a respective front and bottom view of the fuel port adapter 600. The fuel port adapter 600 defines at its center an opening 610 having a profile matching that of a standard jet fuel nozzle spout. In some embodiments, the opening is configured to receive a standard fuel nozzle spout per the SAE specification AS1852. As shown in FIG. 6B, the opening 610 is covered with a pair of spring-loaded flapping doors 620 and 630. Each flapping door 620 or 630 is hinged onto one of the two opposite edges of the opening 610 at points 633 and 635, respectively. The flapping doors can be made of an elastomer material, metal material or plastic material or a combination thereof. A vertical blocking plate 645 separates the two flapping doors 620 and 630 in the middle of the opening 610. In some embodiments, the blocking plate 645 is manufactured as an integral part of the fuel port adapter 600. In other embodiments, the blocking plate 645 is attached to the adapter during assembly.

FIG. 6B also illustrates how the two flapping doors 620, 630, flapping door 620 using spring 660 and flapping door 630 made of elastomer material, are attached to the fuel port adapter 600 to allow a jet fuel nozzle spout to penetrate through the doors and prevent refueling occurring without the nozzle spout having been inserted through the doors. If refueling is attempted when the doors are closed, such as if an avgas nozzle spout is used, any refueling flow will splash or leak back towards the operator, thereby providing a visual indication to an operator to stop the incorrect fuelling. The close fit of the profile of the jet fuel nozzle spout and the flapping doors also reduces the possibility of some of the refueling flow within the fuel tank from splashing back out of the opening 610 during refueling. Furthermore, since the two doors remain closed if not pushed aside by an intruding object like the jet fuel nozzle spout, there are only very small openings at the adapter for fuel to leak out of the adapter even if the adapter/tank cap is inadvertently left off prior to flight.

Figure 6C:
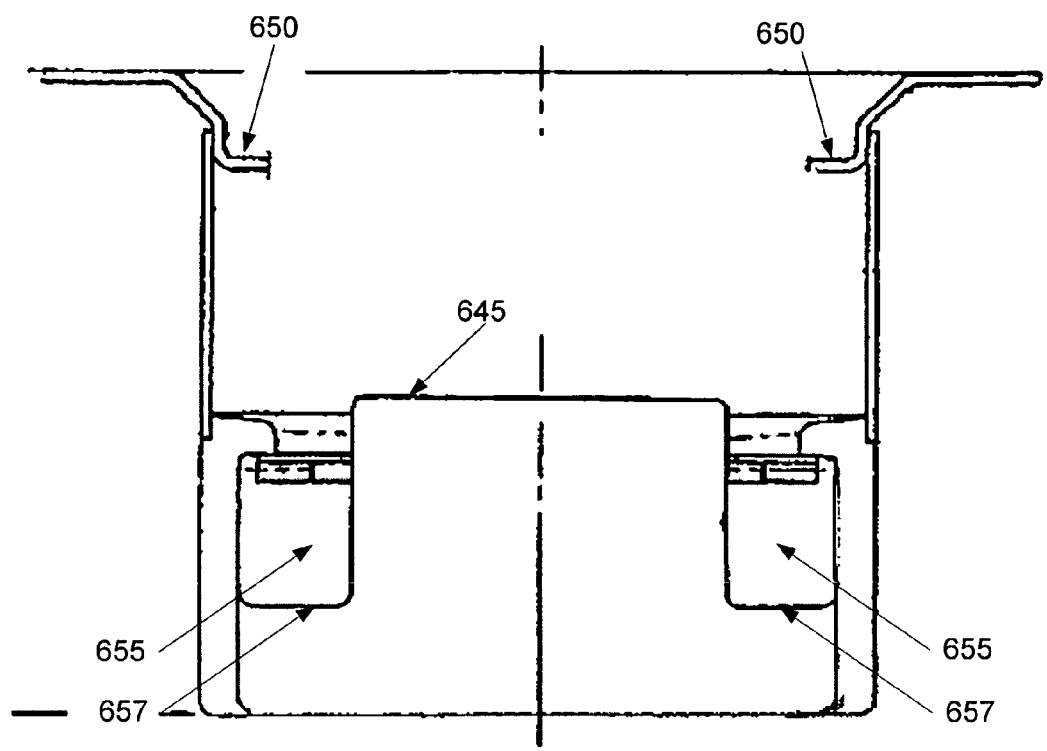
FIG. 6C is a cross-sectional side view illustrating the operation of the fuel port adapter shown in FIG. 6A.

FIG. 6C is a cross-sectional side view of the fuel port adapter 600 as taken along line C-C' of FIG. 6B. Note that the vertical blocking plate 645 has a "u" or "n"-shaped opening 655 designed to fully engage the front-end of a standard jet fuel nozzle spout. Any avgas nozzle spout whose diameter is smaller than the width of the opening 610 is prevented from entering the opening 610 by the blocking plate 645. The recess defined by the blocking plate 645 and the opening 610 allows only a standard jet fuel nozzle spout to be inserted through the blocking plate 645. In addition, the operator does not have to support the jet fuel nozzle spout assembly by hand constantly during refueling, as the nozzle spout assembly is held in the opening 610 by the combination of the ovular opening 610, the blocking plate 645 in the adapter and the fuel port adapter opening 650. Furthermore, the blind end 657 of the blocking plate 645 prevents the jet fuel nozzle spout from extending all the way into the fuel tank and damaging the interior of the fuel tank.

Figure 6D:
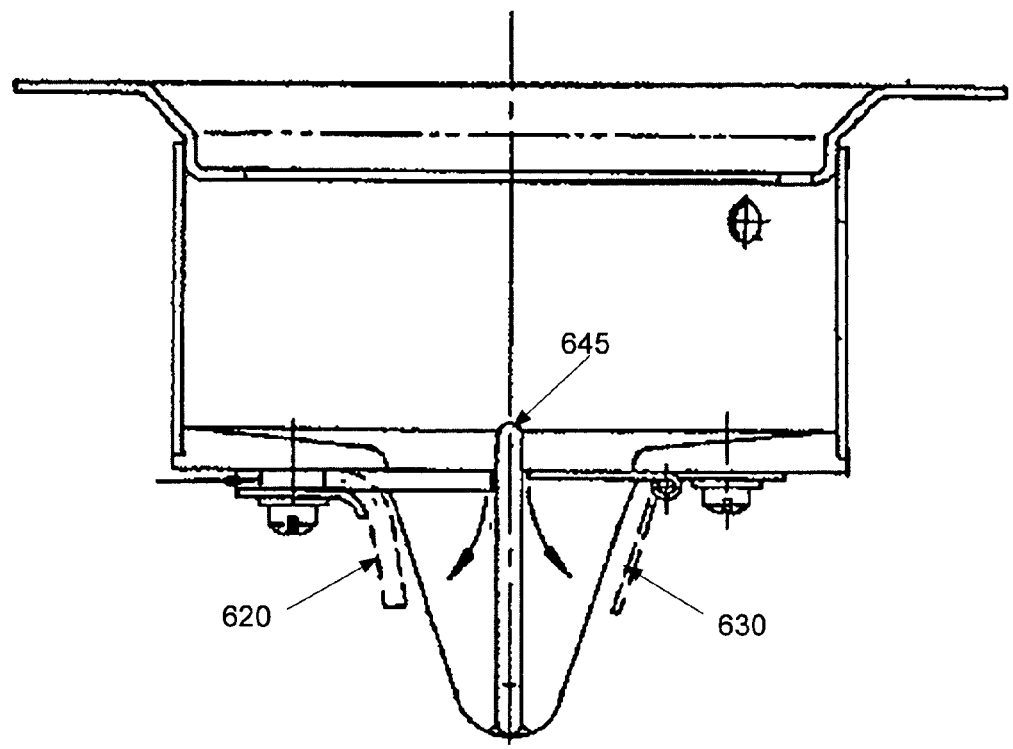
FIG. 6D is another cross-sectional side view illustrating the operation of the fuel port adapter shown in FIG. 6A.

FIG. 6D is another cross-sectional side view of the filler adapter 600 as taken along line D-D' of FIG. 6B, when the two flapping doors 620 and 630 are being pushed away from the blocking plate 645 in the middle of the opening 610. The size of the opening defined by the two opening flapping doors is designed such that an avgas nozzle spout whose diameter is greater than the width of the opening 610, but smaller than the length of the opening 610, will be blocked from entering into the adapter. This further prevents the misfueling of aviation gasoline into the fuel tank.

Figure 7B:
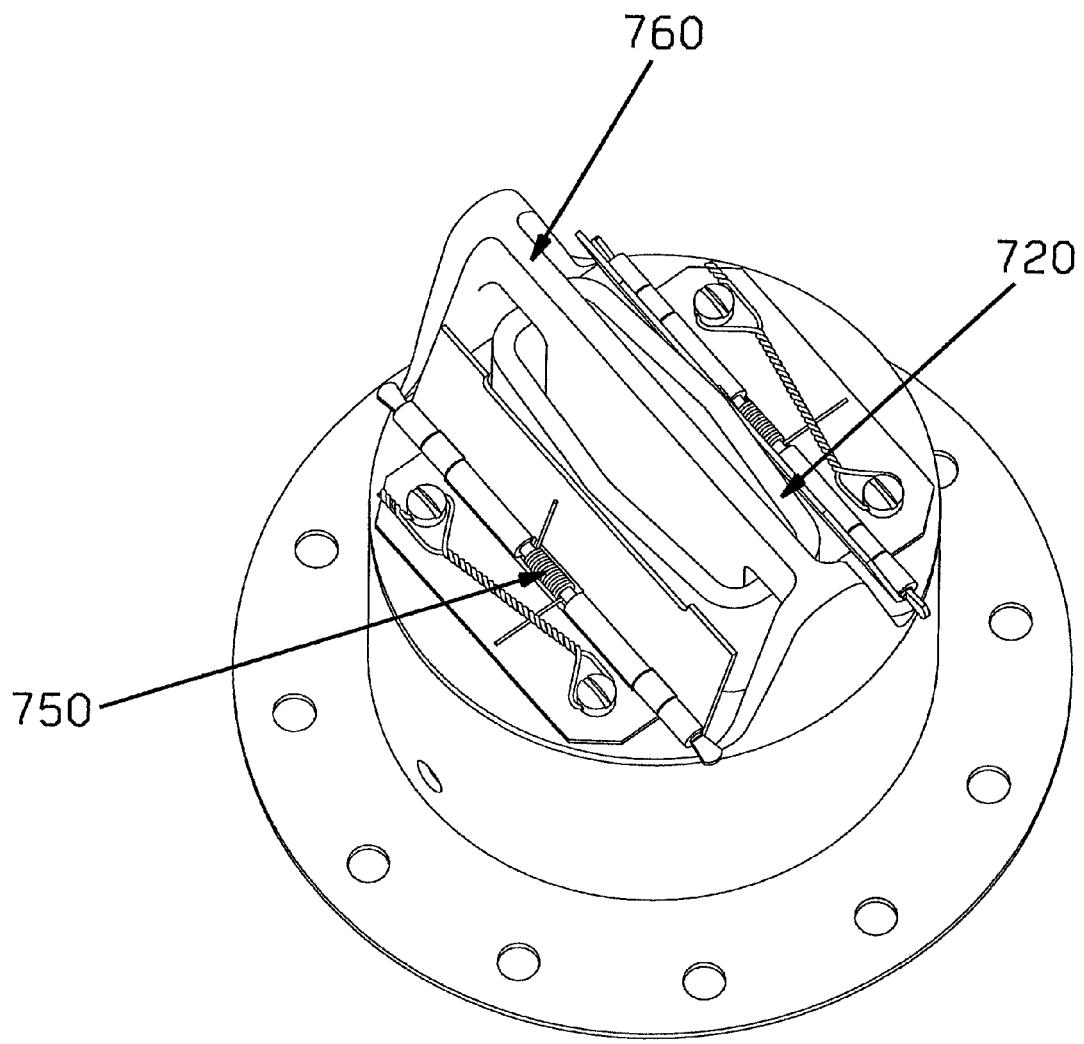

FIG. 7A is a 3-D perspective view of a fuel port adapter 710 mentioned above in connection with FIGS. 6A-6D and a standard jet fuel nozzle spout 720. Note that the adapter 710 includes a blocking plate 740 in the middle and two flapping doors 730. Each flapping door is hinged to the adapter and operated by a spring 750. FIG. 7B is another 3-D perspective view illustrating how the nozzle spout 720 is blocked by the blocking plate 740 in the fuel port adapter 710. The bar 760 at the bottom of the blocking plate prevents the nozzle spout 710 from moving further into the fuel port adapter 710.

In sum, the implementation of the present invention can effectively prevent accidental refueling of any aircraft that uses jet fuel with avgas and therefore provides an increased level of safety to prevent engine failures in flight due to misfueling.

The foregoing descriptions of specific embodiments of the present invention are presented for purposes of illustration and description. They are not intended to be exhaustive or to limit the invention to the precise forms disclosed. Obviously many modifications and variations are possible to one skilled in the art in view of the above teachings. For example, although the above embodiments describe jet-fuel and avgas nozzle spouts, the same principles and features, including the interference devices and blocking plates, may be used to prevent any undesired nozzle spout from being inserted into a particular fuel port adapter. Also, any figures described herein are not drawn to scale. The embodiments were chosen and described in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. It is intended that the scope of the invention be defined by the following claims and their equivalents.

What is claimed is:

1. A fuel introduction device, comprising:
   a jet fuel port adapter defining an opening configured to receive a jet fuel nozzle spout therein, wherein the jet fuel nozzle has a substantially oval shaped cross-section; and
   a permanently fixed interference device coupled to said jet fuel port adapter within said opening to prevent the insertion of an avgas fuel nozzle spout being inserted into said opening, where the avgas fuel nozzle has a substantially circular cross-section.

2. The fuel introduction device of claim 1, wherein said interference device is selected from a group consisting of one or more: vertical plates, vertical cells, vertical tubes, and vertical rods, and any combination of the aforementioned.

3. The fuel introduction device of claim 1, wherein said interference device is configured to be received within an opening defined by said jet fuel nozzle spout.

4. The fuel introduction device of claim 1, wherein during refueling there is no leakage of jet fuel when said jet fuel nozzle spout is fully inserted into said opening.

5. The fuel introduction device of claim 1, wherein during refueling a front surface of said avgas nozzle spout is configured to at least partially contact said interference device such that said avgas nozzle spout cannot be inserted into said opening.

6. The fuel introduction device of claim 5, wherein during refueling at least a portion of avgas flowing out of said avgas nozzle spout leaks out of said fuel introduction device when said avgas nozzle spout is not fully inserted into said opening.

7. The fuel introduction device of claim 1, wherein said interference device is a fixed vertical plate disposed substantially at a center of the fuel port adapter.

8. A misfueling prevention device, comprising:
   a jet fuel port adapter defining an opening configured to receive a jet fuel nozzle spout therein, wherein the jet fuel nozzle has a substantially oval shaped cross-section;
   a fixed blocking plate attached to said jet fuel port adapter within said opening, said blocking plate configured to be received within a hole defined by said jet fuel nozzle spout while preventing an avgas fuel nozzle spout from being inserted into said opening, where the avgas fuel nozzle has a substantially circular cross-section;
   at least one door hinged to said fuel port adapter; and
   a biasing mechanism to bias said at least one door to cover said opening until said jet fuel nozzle spout is inserted into said opening.

9. The misfueling prevention device of claim 8, wherein said blocking plate has an "n"-shaped opening allowing said jet fuel nozzle spout to be inserted into at least a portion of said fuel port adapter.

10. The misfueling prevention device of claim 9, wherein said avgas nozzle spout is in direct contact with a top surface of said blocking plate before it is inserted into said "n"-shaped opening.

11. The misfueling prevention device of claim 8, wherein said at least one door is spring-loaded by said biasing mechanism.

12. The misfueling prevention device of claim 8, wherein said at least one door is made of a material selected from a group consisting of one or more: elastomer material, metal material, and plastic material, and any combination thereof.

13. The misfueling prevention device of claim 8, wherein said at least one door prevents avgas flowing out of an avgas nozzle spout from entering said opening.

14. The misfueling prevention device of claim 8, wherein said at least one door causes splash back of avgas flowing out of an avgas nozzle spout.

15. The misfueling prevention device of claim 8, wherein said at least one door prevents jet fuel from leaking out of said opening when said fuel port adapter is not covered with a fuel cap.

16. The misfueling prevention device of claim 8, wherein said blocking plate is a fixed vertical plate disposed substantially at a center of the fuel port adapter.

* * * * *